(12) United States Patent
Hawley et al.

(10) Patent No.: US 6,421,396 B1
(45) Date of Patent: *Jul. 16, 2002

(54) VARIABLE RATE MODULATOR

(75) Inventors: Robert A. Hawley, Tustin; Robindra B. Joshi, Torrance; Huan-Chang Liu, Irvine, all of CA (US)

(73) Assignee: Broadcom Corporation, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,518

(22) Filed: Apr. 16, 1997

(51) Int. Cl.[7] .............................................. H04L 27/20
(52) U.S. Cl. ........................ 375/308; 375/295; 332/103
(58) Field of Search ................................ 375/295, 298, 375/308, 261, 280, 281, 372, 376; 455/118; 332/103; 341/61, 144; 331/18, 25, 1 R; 364/724.1, 723; 708/290, 313; 327/147, 156

(56) References Cited

U.S. PATENT DOCUMENTS

| 5,412,352 A | | 5/1995 | Graham ...................... 332/103 |
| 5,479,457 A | * | 12/1995 | Waters ........................ 375/372 |
| 5,500,892 A | | 3/1996 | Essig .......................... 379/345 |
| 5,519,732 A | | 5/1996 | Chester ....................... 375/295 |
| 5,606,319 A | | 2/1997 | Yatim et al. ................. 341/144 |
| 5,748,126 A | * | 5/1998 | Ma et al. ..................... 341/143 |
| 5,764,113 A | | 6/1998 | Snell .......................... 332/103 |
| 5,768,328 A | * | 6/1998 | Nielsen ....................... 375/372 |
| 5,783,974 A | | 7/1998 | Koslov et al. .............. 332/103 |

OTHER PUBLICATIONS

Henry Samueli, et al., "VLSI Architectures for a High–Speed Tunable Digital Modulator/Demodulator/BandPass–Filter Chip Set", Integrated Circuits and Systems Laboratory Electrical Engineering Department University of California, Los Angeles, (ISCAS '92), 4 pages.

* cited by examiner

Primary Examiner—Young T. Tse
(74) Attorney, Agent, or Firm—Christie, Parker & Hale, LLP

(57) ABSTRACT

Clock signals and digital data signals at a variable frequency are introduced to the input of a FIFO and are passed from the FIFO at a second (or intermediate) frequency controlled by a numerically controlled oscillator. To regulate the frequency of the signals from the numerically controlled oscillator, the phases of the clock signals at the variable frequency are compared in a phase detector with the phases of the signals from the numerically controlled oscillator to generate an error signal. The error signals and the signals at a fixed sampling frequency higher than the intermediate frequency regulate the frequency of the signals from the numerically controlled oscillator and thus the frequency of the digital data signals from the FIFO. The digital data signals from the FIFO are converted to a pair of signals at the second frequency. The pair of signals at the second frequency have individual ones of a plurality of analog levels dependent upon a code indicated by successive pairs of the digital data signals. The signals at the second (or intermediate) frequency modulate a pair of trigonometrically related signals at the fixed sampling frequency. The modulated signals at the fixed sampling frequency are combined and the combined signals are sampled at the fixed sampling frequency to corresponding analog values by a digital-to-analog converter.

18 Claims, 5 Drawing Sheets

VARIABLE RATE MODULATOR

FIELD OF THE INVENTION

This invention relates to a system including a variable rate modulator for (1) varying the rate at which signals are modulated in accordance with variations in the rate of introduction of digital data to the system and (2) processing the modulated signals to provide output signals at a fixed frequency.

BACKGROUND OF THE INVENTION

In recent years, a number of different applications have arisen in which digital signals representing data are processed and the processed signals are then converted to analog signals. For example, such applications have included the transmission of television signals through coaxial lines to homes. In such systems, the digital data is converted to analog signals and the analog signals are then transmitted through coaxial lines to homes of subscribers. Other applications are in microwave links to satellite communications.

In a number of the different applications involving the processing of digital data and the conversion of the processed digital data to analog signals, the digital data is provided at a variable frequency or rate and the analog signals are provided at a fixed frequency different from the variable frequency or rate. For example, the digital data may be provided in the range of approximately 10–40 megabits per second and the analog signals may be sampled at a fixed frequency of approximately 120 megahertz.

In the above example, the digital signals in the range of 10–40 megabits/second are converted to an intermediate frequency having a fixed value. For example, the digital signals in the range of 10–40 megabits may be converted to signals at an intermediate frequency of approximately 5 megahertz. The signals at the intermediate frequency are then used to modulate the signals at the fixed sampling frequency of approximately 120 megahertz.

As will be seen from the above discussion, a considerable range of frequencies (e.g. 10–40 megabits/second) has to be converted to a single fixed intermediate frequency (e.g. 5 megahertz). This is not easy. If the conversion is not accurate, the signals at the intermediate frequency jitter. When the signals illustratively provide television information, the jitter produces a significant deterioration in the quality of the television image.

BRIEF DESCRIPTION OF THE INVENTION

This invention provides a system for, and a method of, converting digital data signals variable through a wide range of frequencies or rates into signals at a fixed intermediate frequency. This conversion occurs without any jitter in the signals at the fixed intermediate frequency. The signals at the fixed intermediate frequency then modulate signals at a fixed sampling frequency significantly higher than the fixed intermediate frequency. When the system of this invention is illustratively used to provide television images, the television images have a high resolution.

In one embodiment of the invention, clock signals and digital data signals at a variable frequency are introduced to an input of a FIFO (first-in, first-out) and are passed from the FIFO at a second (or intermediate) frequency controlled by a numerically controlled oscillator. To regulate the frequency of the signals from the numerically controlled oscillator, the phases of the clock signals at the variable frequency are compared in a phase detector with the phases of the signals from the numerically controlled oscillator to generate an error signal.

The error signals and the signals at a fixed sampling frequency higher than the intermediate frequency regulate the frequency of the signals from the numerically controlled oscillator and thus, the frequency of the digital data signals from the FIFO. The digital data signals from the FIFO are converted to a pair of signals at the second frequency. The pair of signals at the second frequency have individual ones of a plurality of analog levels dependent upon a code indicated by successive pairs of the digital data signals.

The signals at the second (or intermediate) frequency modulate a pair of trigonometrically related signals at the fixed sampling frequency. The modulated signals at the fixed frequency are combined and the combined signals are converted at the fixed sampling frequency to corresponding analog values by a digital-to-analog converter.

DETAILED DESCRIPTION OF THE INVENTION

Figure 1:
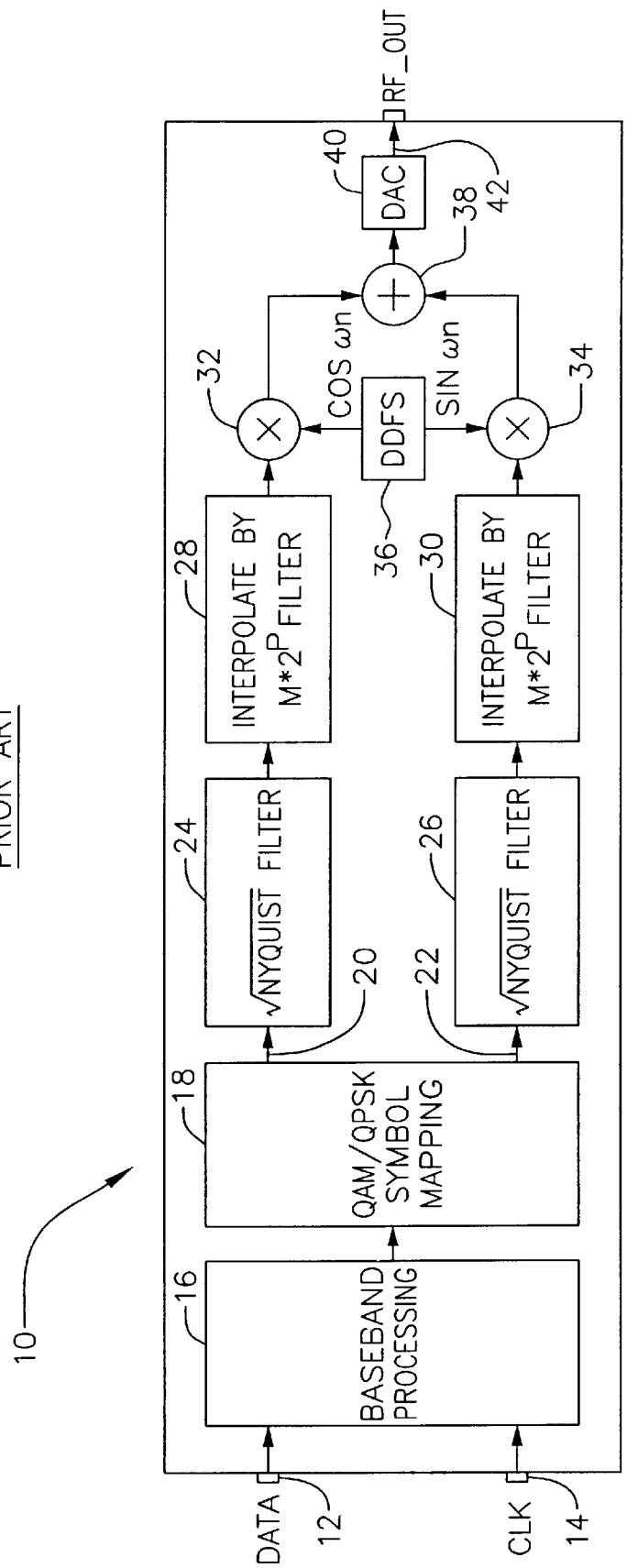
FIG. 1 is a circuit diagram, primarily in block form, of a system constituting an embodiment of the prior art.

FIG. 1 shows a system, generally indicated at 10, of the prior art for transmitting digital data at a variable frequency, for processing the digital data and for converting the digital data at a fixed frequency to analog data. In the system 10, the digital data is provided a the variable frequency on a line 12 and. clock (CLK) signals are provided on line 14 at the same variable frequency. This variable frequency may vary through a rate such as approximately 10–40 megabits per second. Several processing functions are then performed on the data in a well known manner and are indicated by stage 16 designated as baseband processing. For example, these processing functions may include a data scrambler, an error detector and a stage operative on a preamble in the data to achieve synchronization.

The signals from the stage 16 are then introduced to a stage 18 which may be constructed in a well known manner. The stage 18 is designated as QAM (quadrature amplitude modulated)/QPSK (differential quadrature phase shift keyed) symbol mapping. For example, in 16-QAM, the stage 18 operates upon successive pairs of the digital data signals from the stage 16 to produce signals having individual ones of four amplitude levels ±1, ±3. Such signals with such amplitude levels are produced in such environments as coaxial cable lines. Pairs of signals t such amplitude levels are produced by the stage 18.

The signals on the lines 20 and 22 are respectively introduced to square root Nyquist filters 24 and 26 which are well known in the art. The Square root Nyquist filters constitute low pass filters. The signals from the stages 24 and 26 are then respectively introduced to interpolation filters 28 and 30 which may be also constructed in a well known manner in the prior art embodiment shown in FIG. 1. Each of the filters 28 and 30 may constitute a plurality of stages each multiplying, by an integer, the frequency of the signals introduced to it. For example, each of the filters 28 and 30 may constitute P stages each operative to multiply by the integer 2 the frequency of the signals introduced to it.

Thus, the interpolation filters 28 and 30 may multiply the frequency of the signals by a value $M*2^P$. It will be appreciated that the frequency of the signals in different ones of the stages in the interpolation filter may be multiplied by any integer other than 2. In the above equation, M may constitute an integer by which the last stage in each of the interpolate filters 28 and 30 multiplies the frequency.

The signals from the interpolation filters 28 and 30 are respectively introduced to multipliers 32 and 34. The multipliers also receive signals from a direct digital frequency synthesizer (DDFS) 36 which provides signals at a frequency which may be considered to constitute a sampling frequency. The signals introduced to the multipliers 32 and 34 from the synthesizer 36 may be respectively modulated with the interpolated data signals. The multipliers 32 and 34 respectively modulate the signals from the filters 28 and 30 on the carrier frequency of the cosine and sine signals from the frequency synthesizer 36. This sampling frequency may be approximately 120 megahertz.

The modulated signals from the multipliers 32 and 34 pass to an adder 38. The resultant signals from the adder 38 are converted to analog signals in a digital-to-analog converter 40 and the analog signals are introduced to an output line 42. As will be seen from the subsequent discussion, the signals from the frequency synthesizer 36 are at a fixed sampling frequency and the signals from the adder 38 are sampled at this same fixed frequency to produce analog signals.

As previously indicated, the data signals on the line 12 and the clock signals on the line 14 may have a variable frequency. The signals from the interpolation filters 28 and 30 preferably have a fixed (or intermediate) frequency. As will be apparent, the interpolation filters 28 and 30 cannot provide a fixed frequency when the signals on the lines 12 and 14 have a variable frequency and the interpolation filters 28 and 30 provide frequency multiplications in which the multipliers are integral numbers. This has accordingly provided serious operational limitations in the prior art. For example, it has introduced jitters into the signals at the intermediate frequency from the interpolate filters 28 and 30 and thus has produced jitters at the output line 42. When the signals at the output line 42 constitute television signals, the television signals are accordingly blurred.

This invention provides a system for, and methods of, maintaining the frequency of the signals introduced to the stages 28 and 30 substantially constant even when the rate or frequency of the data signals 12 and the clock signals 14 varies over a range as high as 10–40 megabits per second. The system and method of this invention are generally indicated at 48 in FIG. 2. It is identical to the system 10 of FIG. 1 except that it includes interpolate filters 50 and 52 each of which includes a plurality of stages and each of which is intended to be substituted for a corresponding one of the filters 28 and 30 in FIG. 1. All of these stages (except the last stage) interpolate by an integer such as a value of 2. For example, there may be stages each of which interpolates by a value of 2 or 3. The last stage may interpolate by a value which is not an integer. This value may be represented by M/N where N is an integer such as 2 or 3 and M is a value which may be other than an integer. By providing the value M/N where M is not an integer, the intermediate frequency from the filters 50 and 52 can provide signals at the desired intermediate frequency such as five (5) megahertz.

Figure 3:
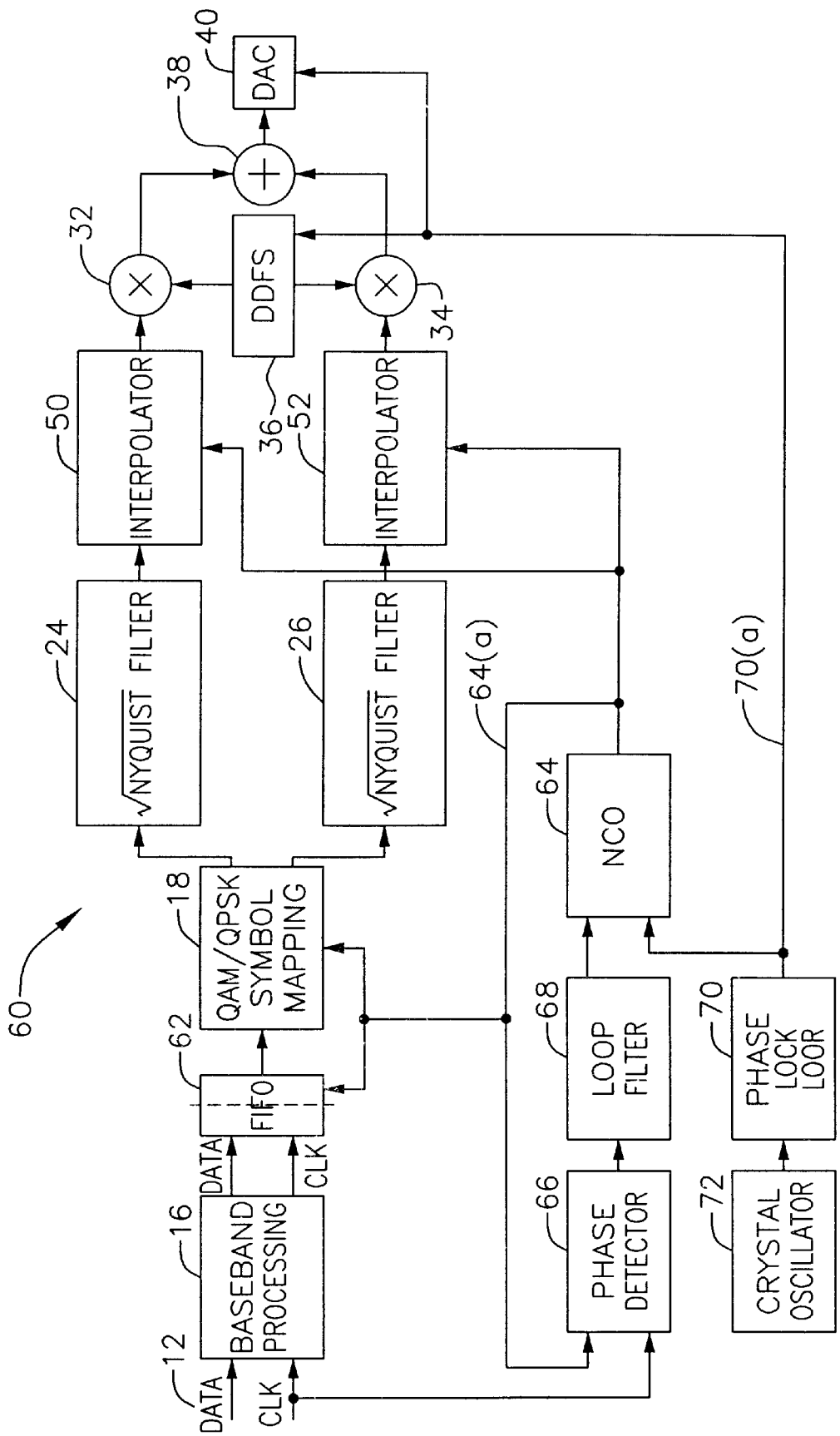
FIG. 3 is a diagram, primarily in block form, of the system of this invention.

The system of this invention is shown on a schematic block diagram basis in FIG. 3 and is generally indicated at 60 in FIG. 3. It includes a closed loop servo for determining the value M/N and for regulating the operation of the system to maintain the intermediate frequency, for example, at five (5) megahertz. The system 60 includes the data line 12, the clock line 14, the baseband processing stage 16, the QAM/QPSK symbol mapping stage 18, the digital frequency synthesizer 36 and the converter 40 also shown in FIG. 1. However, a first-in-first-out register (FIFO) 62 is connected between the output of the base band processing stage 16 and the input of the symbol mapping stage 18 to change the frequency of the signals from the stage 16 before the signals are introduced to the stage 18.

The output end of the FIFO 62 and the input end of the symbol mapping stage 18 receive signals from the output of a numerically controlled oscillator (NCO) 64. The numerically controlled oscillator 64 may be considered to be the digital equivalent of a voltage controlled oscillator in that it provides oscillatory signals at a variable frequency dependent upon digital inputs to the oscillator. The construction and operation of numerically controlled oscillators such as the oscillator 64 are well known in the art.

The output of the numerically controlled oscillator 64 is also introduced to an input of a phase detector 66, another input of which receives the clock signals on the line 14. The output of the phase detector 66 passes to the input of a loop filter 68, the output of which passes to an input of the numerically controlled oscillator 64.

The numerically controlled oscillator 64 also receives the output from a phase lock loop 70 having its input connected to the output of a crystal oscillator 72. The output of the phase lock loop 70 also passes to the digital frequency synthesizer 36 and to the digital-to-analog converter 40. The phase lock loop 70 provides an increase in a well known manner of the frequency of the signals from the crystal oscillator 72.

The phase detector 66 compares the phase of the clock signals on the line 14 with the phase of the output signals from the numerically controlled oscillator 64 and produces an error signal having characteristics dependent upon any difference in the phases of the compared signals. These error signals are filtered by the loop filter 68 and the filtered signals are introduced to the numerically controlled oscillator 64. These error signals are compared in the numerically controlled oscillator 64 with the signals from the phase locked loop 70 to obtain the production from the oscillator of the signals at the fixed intermediate frequency such as five (5) megahertz.

In this way, the frequency of the signals from the numerically controlled oscillator 64 is dependent upon the relative frequencies of the clock signals on the line 14 and the signals from the crystal oscillator 72. For any particular frequency, the frequency of the signals from the numerically controlled oscillator 64 is regulated so that the frequency of the signals introduced to the output end of the FIFO 62 and the input end of the symbol mapping stage 18 is substantially constant at the frequency related by an integer to the intermediate frequency such as 5 megahertz. Thus, in effect, the servo loop represented by the phase detector 66, the loop filter 68, the crystal oscillator 72, the phase lock loop 70 and the numerically controlled oscillator 64 provides the division of M/N.

Figure 2:
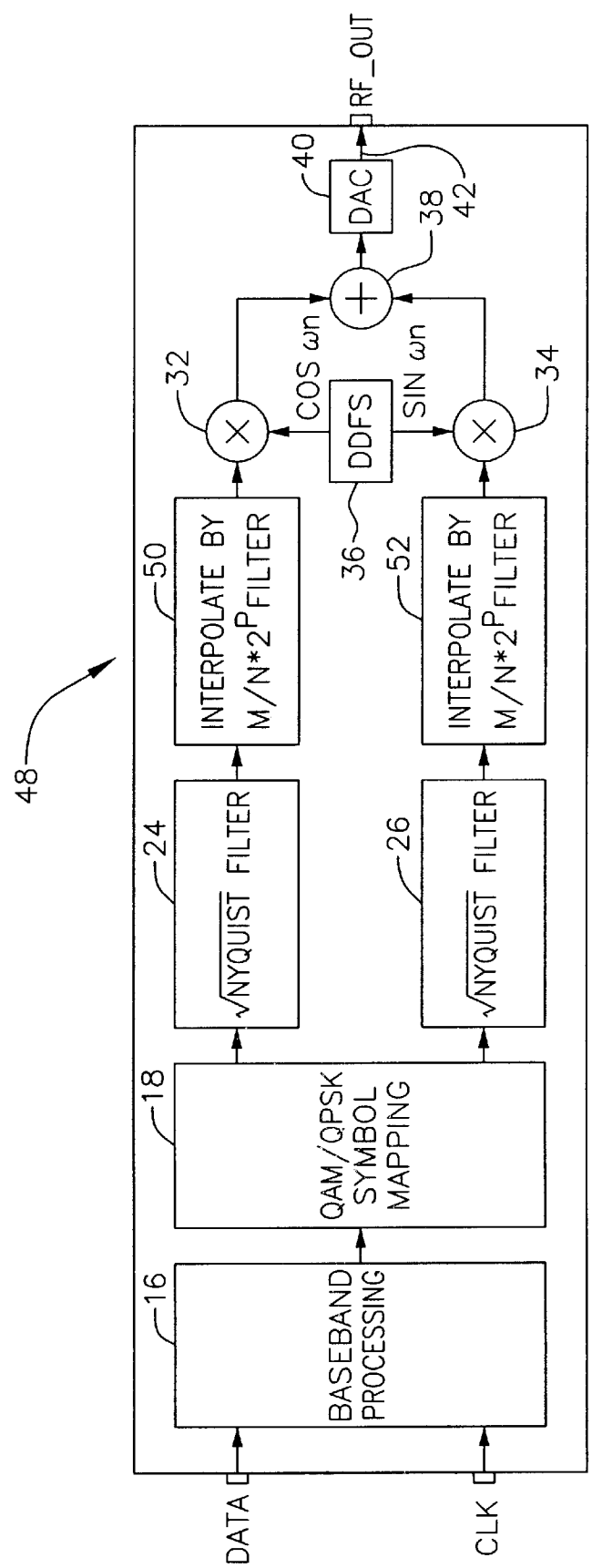
FIG. 2 is a circuit diagram, primarily in block form of a portion of the system similar to that shown in FIG. 1 and shows a significant difference between the system of this invention and the system of the prior art.
Figure 4:
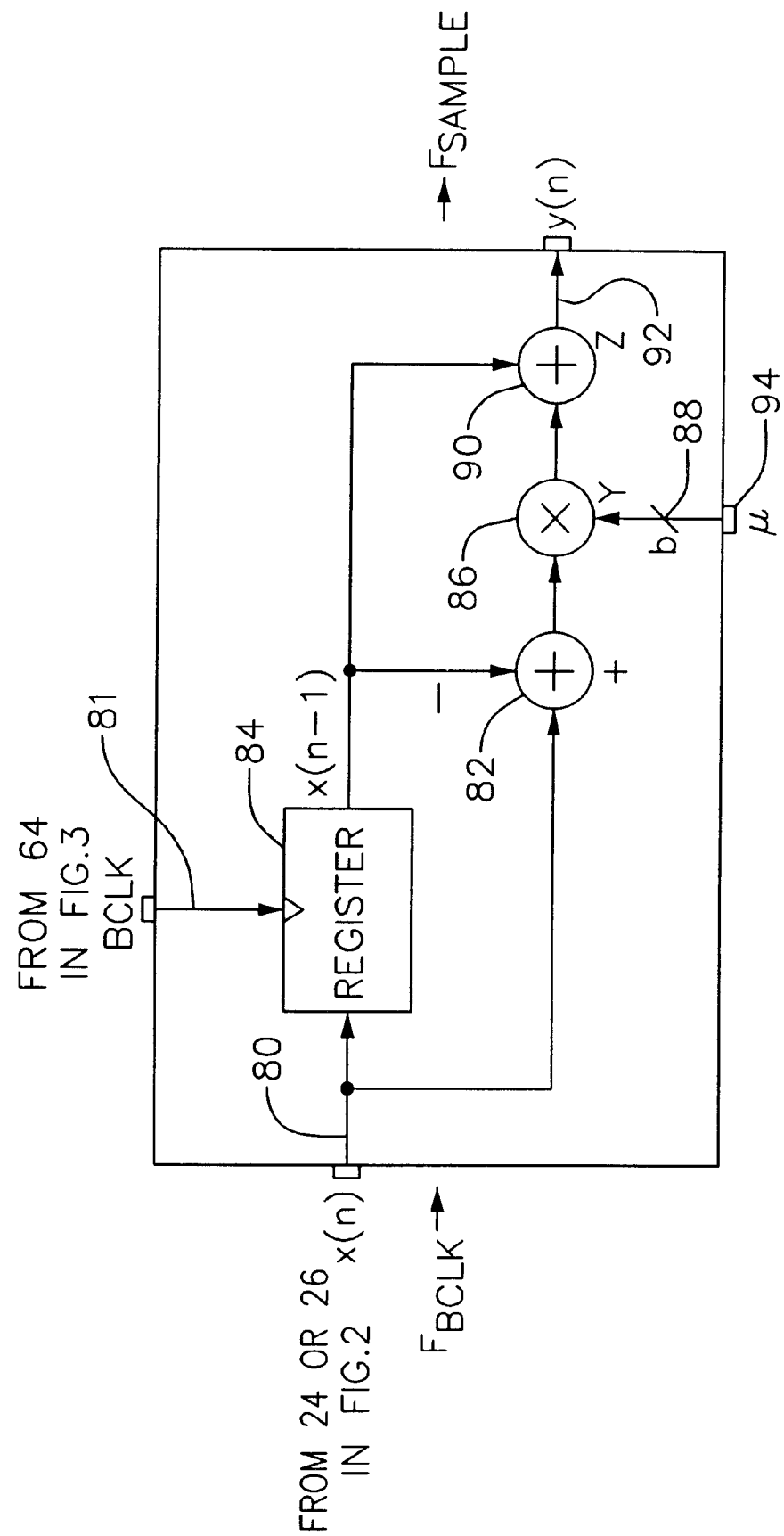
FIG. 4 is a circuit diagram primarily in block form, of a portion of the system shown in FIG. 3 and shows this portion of the system in additional detail.

FIG. 4 illustrates an example of a linear interpolation provided by each of the interpolators 50 and 52 in the system shown in FIGS. 2 and 3. The output from the symbol mapping stage 18 is introduced as at 80 to an adder 82 and the input terminal of a register 84 by way of Nyquist filter stage 24 or 26. The register 84 is clocked by the output signal on a line 81 from the numerically controlled oscillator 64. The negative value of the output from the symbol mapping stage 18 is introduced to the adder 82 by way of Nyquist filter stage 24 or 26.

The output from the adder 82 then passes to a multiplier 86 which also receives an input on a line 88. This input represents a value $\mu$ between 0 and 1 and will be described in detail subsequently. The output from the multiplier 86 passes to an adder 90 which also receives the output from the register 84. The output of the adder 90 is provided on a line 92.

The output of the mapping stage 18 is delayed by one clock pulse by the register 84 and is then subtracted in the adder 82 from the output on the line 80 at the next clock pulse. The adder 82 accordingly provides an output represented as $$X(n)-x(n-1)$$

where x(n−1) represents the output at a first clock cycle and x(n) represents the output at the next clock cycle. The value of x(n)−x(n−1) is then multiplied in the multiplier 86 to provide a value of $\mu[x(n)-x(n-1)]$. The value of $\mu$ is then provided at a terminal 94. This value is then added with the value of x(n−1) from the register 84 to provide an output of $$y(n)=x(n-1)+\mu[x(n)-x(n-1)]$$

where y(n) is an interpolated value between x(n)−x(n−1). The value y(n) is indicated at the right end of FIG. 4 and may be considered to provide signals at an $F_{SAMPLE}$ frequency.

As previously described, the value of 4 is between 0 and 1. It constitutes the phase difference between the clock signals from the phase lock loop 70 in FIG. 3 (i.e. signals at the sample clock frequency) and the output 64(a) of the numerically controlled oscillator 64 in FIG. 3. The value of $\mu$ may be seen from the following illustrative relationship between the clock signals from the phase lock loop 70 and the clock signals on the line 14:

$$F_{14}=F_{70}$$

where $F_{14}$–the frequency of the signals on the line 14 and $F_{70}$=the frequency of the signals from the phase lock loop 70. In successive clock signals, $\mu$ will then be 0, 1/4, 1/2, 3/4, 0, 1/4, 1/2, etc. It will be appreciated that the value of (1/4) is illustrative only and that 4 may be considered to constitute any value between 0 and 1.

Figure 5:
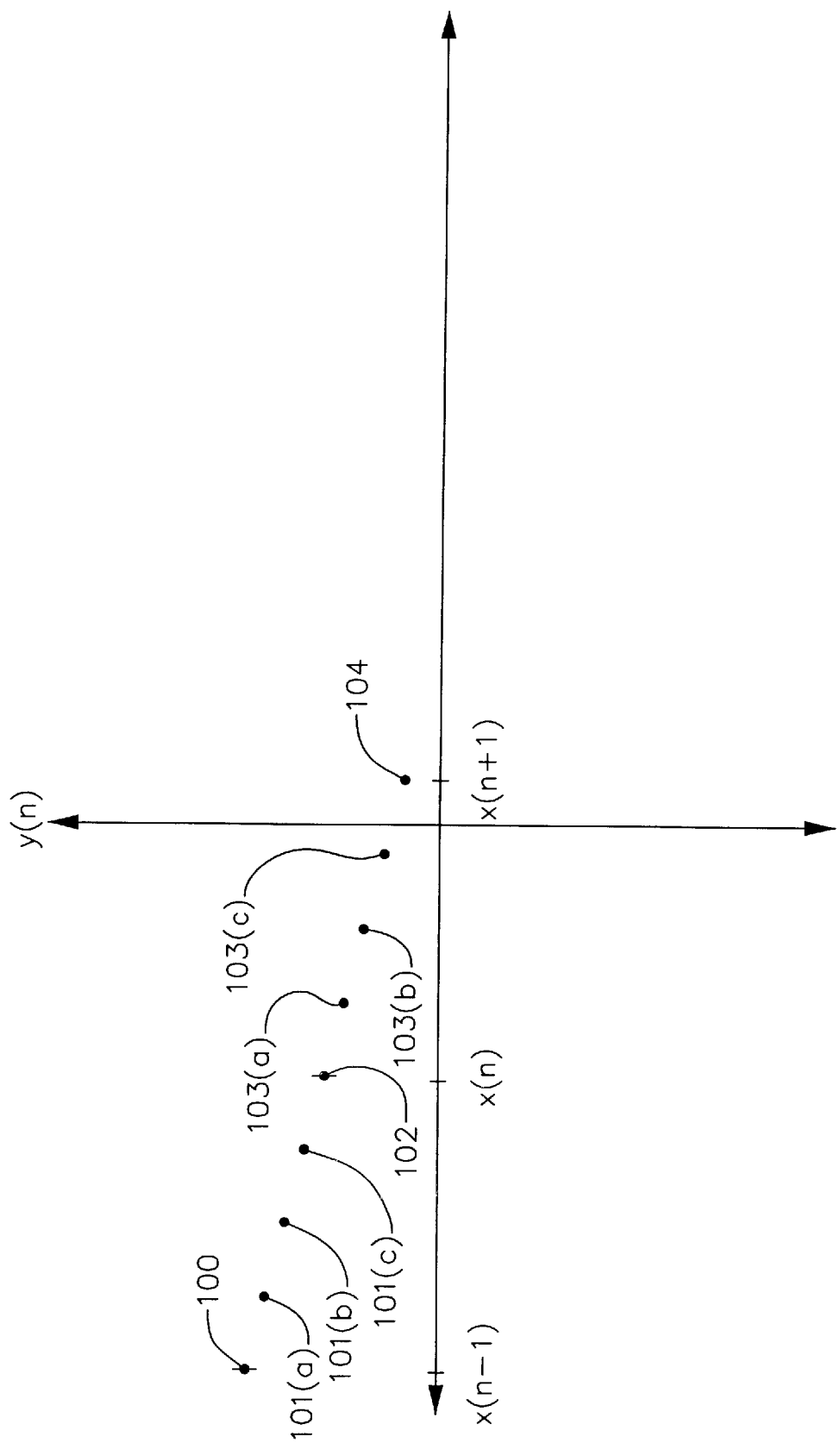
FIG. 5 shows a curve illustrating how the system of the invention provides a linear interpolation between successive values introduced to the system, thereby enhancing the image resolution by the system of this invention of the image represented by the data signals introduced to the system.

FIG. 5 illustrates at 100, 102 and 104 the data signals on the line 12. FIG. 5 also illustrates at 101a, 101b and 101c the signals interpolated between the input signals 100 and 102 and at 103a, 103b and 103c the signals interpolated between the input signals 102 and 104. The interpolated signals 101a, 101b and 101c and the interpolated signals 103a, 103b and 103c are provided when $\mu$=1/4 corresponding to the value of $\mu$ illustratively provided in the previous paragraph.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A signal processing system comprising:
   a frequency control loop responsive to an input clock at a variable frequency and a sample clock at a sample clock frequency, for providing a symbol clock at a symbol clock frequency;
   a buffer, for receiving an input signal at the variable frequency and responsive to said symbol clock, outputting a data signal at said symbol clock frequency;
   a symbol mapper for converting said data signal to a pair of data signals at the symbol clock frequency; and
   interpolators for converting said pair of data signals at the symbol clock frequency to a pair of interpolated signals at the sample clock frequency.

2. The signal processing system of claim 1 wherein said interpolators are responsive to a phase offset signal representing an offset in phase between the sample clock and the symbol clock, for converting said pair of filtered data signals at the symbol clock frequency to the pair of interpolated signals at the sample clock frequency.

3. The signal processing system of claim 2 further comprising:
   modulators for modulating said pair of interpolated signals with trigonometric signals having a carrier frequency to form a pair of modulated signals; and
   a summer for combining said pair of modulated signals.

4. The signal processing system of claim 3 further comprising a digital to analog converter for converting an output of said summer to an analog signal.

5. The signal processing system of claim 1 wherein said frequency control loop comprises:
   a phase detector that provides an error signal representing the phase difference between the input clock and the symbol clock;
   and a numerically controlled oscillator, responsive to said error signal and said sample clock for providing said symbol clock.

6. The signal processing system of claim 5 wherein said frequency control loop further comprises a loop filter that filters said error signal to the numerically controlled oscillator.

7. A method of converting a variable frequency input data signal to an output signal comprising:
   generating a first clock at a first clock frequency as a function of an input clock at a variable frequency and a sample clock at a sample clock frequency;
   buffering the variable frequency input data signal;
   outputting the buffered data signal at said first clock frequency;
   converting the outputted data signal to a pair of data signals at the first clock frequency; and
   converting said pair of data signals at the first clock frequency to a pair of interpolated signals at the sample clock frequency.

8. The method of claim 7 further comprising:
   generating an error signal representing an offset in phase between the input clock and the first clock; and
   updating the first clock as a function of said error signal and said sample clock.

9. The method of claim 7 further comprising:

generating a phase offset signal representing an offset in phase between the sample clock and the first clock; and wherein the pair of data signals are converted to said pair of interpolated signals at the sample clock frequency as a function of said phase offset signal.

10. The method of claim 9 further comprising:

modulating the pair of interpolated signals with a trigonometric signal having a carrier frequency to form a modulated signal; and converting said modulated signal to an analog signal.

11. A method of converting a variable frequency input signal to an output signal comprising:

generating a first clock at a first clock frequency as a function of an input clock at a variable frequency and a sample clock at a sample clock frequency;

buffering the variable frequency input signal;

using the first clock to output a data signal at said first clock frequency;

generating a phase offset signal representing an offset in phase between the sample clock and the first clock; and converting the data signal at the first clock frequency to said output signal at the sample clock frequency as a function of said phase offset signal.

12. The method of claim 11 further comprising:

modulating the output signal with a trigonometric signal having a carrier frequency to form a modulated signal; and converting said modulated signal to an analog signal.

13. A signal processing system comprising:

a frequency control loop responsive to an input clock at a variable frequency and a sample clock at a sample clock frequency, for providing a first clock at a first clock frequency;

a buffer for receiving an input signal at the variable frequency and, responsive to said first clock, outputting a data signal at said first clock frequency; and an interpolator for interpolating said data signal in accordance with a phase offset signal representing an offset in phase between the sample clock and the first clock, coupled to the output of the buffer for providing an interpolated signal at the sample clock frequency.

14. The signal processing system of claim 13 wherein the interpolator interpolates the data signal by a non-integer value.

15. The signal processing system of claim 13 wherein the interpolator interpolates the data signal by an integer value.

16. The signal processing system of claim 13 wherein said frequency control loop comprises:

a phase detector that provides an error signal representing the phase difference between the input clock and the first clock;

a loop filter that filters the error signal; and a numerically controlled oscillator responsive to said filtered error signal and said sample clock for providing said first clock.

17. The signal processing system of claim 13 further comprising a modulator for modulating the interpolated signal with a trigonometric signal having a carrier frequency to form a modulated signal.

18. The signal processing system of claim 17 further comprising a digital to analog converter for converting said modulated signal to an analog signal.

* * * * *